US 6,586,116 B1

(12) United States Patent
Bian et al.

(10) Patent No.: US 6,586,116 B1
(45) Date of Patent: **\*Jul. 1, 2003**

(54) NONMETALLIC THIN FILM MAGNETIC RECORDING DISK WITH PRE-SEED LAYER

(75) Inventors: Xiaoping Bian, San Jose, CA (US); Mary Frances Doerner, Santa Cruz, CA (US); Tim Minvielle, San Jose, CA (US); Mohammad Taghi Mirzamaani, San Jose, CA (US); Kai Tang, San Jose, CA (US); Li Tang, Fremont, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,710

(22) Filed: Feb. 9, 2000

(51) Int. Cl.$^7$ .................................. G11B 5/66
(52) U.S. Cl. .................. 428/651; 428/653; 428/668; 428/65.3; 428/65.6; 428/65.7; 428/215; 428/336; 428/694 TS
(58) Field of Search ................. 428/69.3, 65.7, 428/332, 611, 663, 668, 900, 694 TS, 694 TM, 637, 650, 666, 667, 678, 65.6, 336, 651, 653, 215; 204/192.2

(56) References Cited

U.S. PATENT DOCUMENTS

| | | | | |
|---|---|---|---|---|
| 5,605,733 A | * | 2/1997 | Ishikawa et al. | 428/65.3 |
| 5,693,426 A | | 12/1997 | Lee et al. | 428/611 |
| 5,700,593 A | * | 12/1997 | Okumura et al. | 428/694 TS |
| 5,736,262 A | * | 4/1998 | Ohkijima et al. | 428/611 |
| 5,789,056 A | * | 8/1998 | Bian et al. | 428/65.3 |
| 5,922,442 A | * | 7/1999 | Lal et al. | 428/216 |
| 5,995,472 A | * | 11/1999 | Fujii et al. | 369/110 |
| 6,010,795 A | * | 1/2000 | Chen et al. | 428/611 |
| 6,150,015 A | * | 11/2000 | Bertero et al. | 428/332 |
| 6,156,404 A | * | 12/2000 | Ross et al. | 428/65.3 |
| 6,159,625 A | * | 12/2000 | Ueno | 428/694 T |
| 6,183,832 B1 | * | 2/2001 | Margulies et al. | 428/65.3 |
| 6,197,367 B1 | * | 3/2001 | Matsuda et al. | 427/127 |
| 6,383,667 B1 | * | 5/2002 | Futamoto et al. | 428/694 TS |
| 6,403,241 B1 | * | 6/2002 | Chen et al. | 428/694 TS |

FOREIGN PATENT DOCUMENTS

JP 11-213371 A * 8/1999

OTHER PUBLICATIONS

Horner, I., Hall, N., Cornish, L, Witcomb, M, Cortie, M., and Boniface, T. (J.Alloys Cmpds, 264 (1998), 173).*

(List continued on next page.)

*Primary Examiner*—Paul Thibodeau
*Assistant Examiner*—Kevin M. Bernatz
(74) *Attorney, Agent, or Firm*—Robert O. Guillot; IPLO Intellectual Property Law Offices

(57) ABSTRACT

The design of a magnetic thin film disk, for use in a disk drive, with an amorphous or nanocrystalline pre-seed layer preferably followed by a ruthenium-aluminum (RuAl) seed layer is described. The pre-seed layer may be CrTa or AlTi. The pre-seed layer deposited over a glass substrate, for example, allows a more strongly oriented RuAl seed layer to be deposited and, thus, favorably influences the orientation and grain size in the subsequent layers which include preferably at least one Cr alloy underlayer and at least one magnetic layer.

22 Claims, 4 Drawing Sheets

OTHER PUBLICATIONS

English Translation of Chiyou et al. (JP 11–213371 A).*

JPO Abstract Translation of Tokkyo Kokai 11–213371–A (Image No. JP411213371A).*

X. Bian et al., "Thin Film Seed Layer for Longitudinal Magnetic Recording", filed Apr. 20, 1999, Ser. No. 09/295,267.

X. Bian et al., "Thin Film Magnetic Disk Having Reactive Element Doped Refractory Metal Seed Layer", filed Feb. 6, 1998, Ser. No. 09/020,151.

L.L. Lee, "Seed Layer Induced (002) Crystallographic Texture In NiAl Underlayers", J.Appl. Phys. 79 (8), Apr. 12, 1996, pp. 4902–4904.

D.E. Laughlin, "The Control and Characterization of the Crystallographic Texture of Longitudinal Thin Film Recording Media", IEEE Trans. On Mags., vol. 32, No. 5, Sep. 1996, pp. 3632–3637.

Q. Chen, "Effect of Cr Sub–Seed Layer Thickness on the Crystallographic Orientation of Co–Alloy Recording Media on Glass", IEEE Trans. On Mags., vol. 35, No. 5, Sep. 1999, pp. 2637–2639.

* cited by examiner

NONMETALLIC THIN FILM MAGNETIC RECORDING DISK WITH PRE-SEED LAYER

RELATED APPLICATIONS

The use of an RuAl seed layer, which is included in the preferred embodiment discussed below, is described in a commonly assigned, U.S. patent application with Ser. No. 09/295,267. The use of an onset layer, which is included in the preferred embodiment discussed below, is described in a commonly assigned, U.S. patent application with Ser. No. 08/976,565 entitled "Thin Film Disk with Onset Layer." U.S.P.T.O application Ser. No. 09/020,151, entitled "THIN FILM MAGNETIC DISK HAVING REACTIVE ELEMENT DOPED REFRACTORY METAL SEED LAYER" is mentioned below.

FIELD OF THE INVENTION

This invention relates to the field of thin film materials used in magnetic disks for data storage devices such as disk drives. More particularly the invention relates to thin film layers used to condition a nonmagnetic substrate for subsequent crystalline layer structures.

BACKGROUND OF THE INVENTION

The magnetic recording disk in a conventional drive assembly typically consists of a substrate, an underlayer consisting of a thin film of chromium (Cr) or a Cr alloy, a cobalt-based magnetic alloy deposited on the underlayer, and a protective overcoat over the magnetic layer. A variety of disk substrates such as NiP-coated AlMg, glass, glass ceramic, glassy carbon, etc., have been used. The most common disk in the market is currently made with a substrate disk of AlMg on which a layer of amorphous NiP is electrolessly deposited. The use of the electroless NiP process has several disadvantages including the fact that it is a wet process that must be performed quite separately from the sputtering process by which the remainder of the layers are deposited. It is difficult to achieve the smoothness and uniformity in the NiP surface which is needed for the densities now required for disk drives. The NiP is also a source of corrosion problems and to some degree limits the processing temperatures due to the fact that NiP can become magnetic if heated above a certain point.

The microstructural parameters of the magnetic layer, i.e., crystallographic preferred orientation (PO), grain size and magnetic exchange decoupling between the grains, play key roles in controlling the recording characteristics of the disk. The Cr underlayer is mainly used to influence such microstructural parameters as the PO and grain size of the cobalt-based magnetic alloy. The PO of the various materials forming the layers on the disk is not necessarily an exclusive orientation which may be found in the material, but is merely the dominant orientation. When the Cr underlayer is deposited at elevated temperature on a NiP-coated AlMg substrate a [100] preferred orientation (PO) is usually formed. This PO promotes the epitaxial growth of [11$\bar{2}$0] PO of the hcp cobalt (Co) alloy, thereby improving the in-plane magnetic performance of the disk for longitudinal recording. The [11$\bar{2}$0] PO refers to a film of hexagonal structure whose (11$\bar{2}$0) planes are predominantly parallel to the surface of the film. Since nucleation and growth of Cr or Cr alloy underlayers on glass and most nonmetallic substrates differ significantly from those on NiP-coated AlMg substrates, different materials and layer structures are used on glass substrate disks to achieve optimum results. The conventional NiP coating is not preferable for use on glass for many reasons including those noted above. Nonmetallic substrate disks have typically had a so called "seed layer" sputter deposited onto the substrate before the Cr-alloy underlayer. The use of a judiciously chosen seed layer allows the performance of nonmetallic substrates to exceed NiP/AlMg disks. The seed layer influences nucleation and growth of the underlayer which in turn affects the magnetic layer. Several materials have been proposed in published papers for seed layers such as: Al, Cr, CrNi, Ti, $Ni_3P$, MgO, Ta, C, W, Zr, AlN and NiAl on glass and nonmetallic substrates. (See for example, "Seed Layer induced (002) crystallographic texture in NiAl underlayers," Lee, et al., J. Appl. Phys. 79(8), Apr. 15, 1996, p.4902ff). In a single magnetic layer disk, Laughlin, et al., have described use of an NiAl seed layer followed by a 2.5 nm thick Cr underlayer and a CoCrPt magnetic layer. The NiAl seed layer with the Cr underlayer was said to induce the [10$\bar{1}$0] texture in the magnetic layer. ("The Control and Characterization of the Crystallographic Texture of Longitudinal Thin Film Recording Media," IEEE Trans. Magnetic. 32(5) September 1996, 3632). In one of the related applications noted above, the use of RuAl for a seed layer is disclosed.

The design of magnetic disks has progressed rapidly in recent years making improvements ever more difficult. In some metrics, e.g. signal-to-noise ratio (SNR), even 1 dB improvement is now considered quite significant. As of the time of this application, the highest claimed recording density on magnetic disks by anyone in the industry is between 30 and 40 gigabits per square inch. This density has been achieved only in the laboratory and the density found in the state of the art commercially available disk drive is far below this value. Thermal stability of the recorded information on the disk is the presumed limiting factor as higher densities are sought. A commercially viable disk drive must be capable of maintaining the stored information for periods of time measured in years.

Chen, et al., have recently described experimental results on disks with what they call a Cr sub-seed layer. Glass substrates with a sputtered NiP layer were used to receive the Cr/NiAl/Cr-alloy/Co-alloy layer structure. The article is silent as to the desired crystal structure of the Cr sub-seed layer. (See Q. Chen et al, IEEE Transactions on Magnetics, vol. 35, no. 5, page 2637, September 1999).

SUMMARY OF INVENTION

The thin film disk of the invention includes a thin film pre-seed layer of amorphous or nanocrystalline structure. The pre-seed layer which may be chrome-tantalum (CrTa) or aluminum-titanium (AlTi) is deposited prior to first crystalline layer. Although the pre-seed layer may be amorphous or nanocrystalline, for brevity it will be referred to herein as amorphous which is intended to encompass a nanocrystalline structure. In the preferred embodiment the pre-seed layer is sputtered onto a nonmetallic substrate such as glass, followed by a ruthenium-aluminum (RuAl) layer with B2 structure. The use of the pre-seed layer of the invention improves grain size and its distribution, in-plane crystallographic orientation and coercivity (Hc) and SNR. In a preferred embodiment the pre-seed is followed by the RuAl seed layer, a Cr alloy underlayer, an onset layer and a magnetic layer. The amorphous pre-seed layer also allows use of a thinner RuAl seed layer which results in smaller overall grain size, as well as, a reduction in manufacturing cost due to relatively high cost of ruthenium. The increased coercivity also allows use of a thinner Cr alloy underlayer which also contributes to decreased grain size. Another benefit lies in the fact that the pre-seed layer provides additional thermal conductivity which could help prevent thermal erasures on a glass disk.

Figure 1:
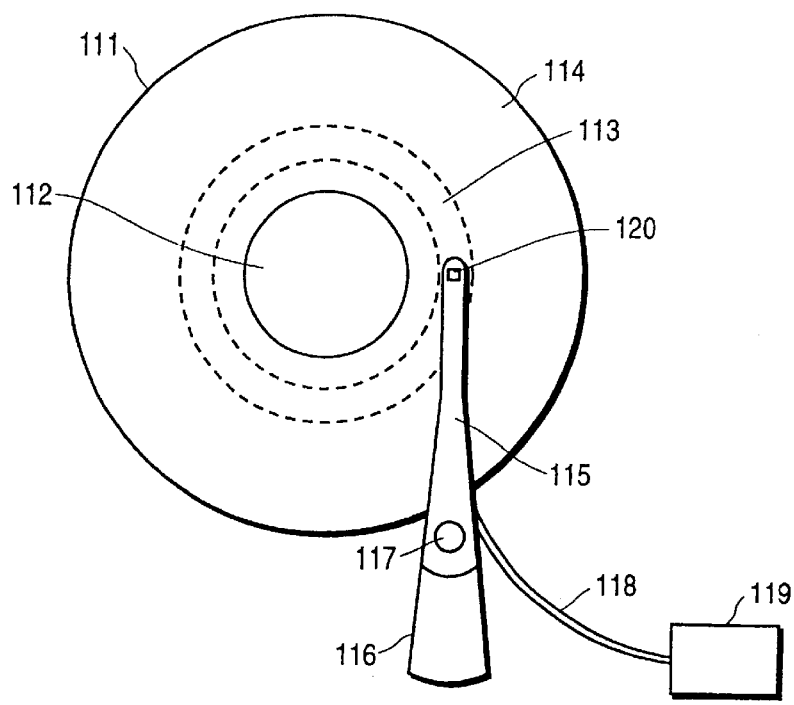
FIG. 1 illustrates a top view of a prior art disk drive with a rotary actuator useful in practicing the present invention.

iting a relatively thick RuAl seed layer but the high cost of RuAl sputtering targets is a major drawback for its use in large scale manufacturing. The use of a CrTa pre-seed layer allows the use of a very thin RuAl seed layer (and thus reduces cost) and an ultra-thin Cr (or Cr-alloys) underlayer on a glass substrate, which in turn enable the subsequent growth of strong ($11\bar{2}0$) oriented Co-alloy layer with controlled smaller grain size.

In the preferred embodiment of the invention, the CrTa pre-seed layer is sputter deposited onto a glass substrate followed by a thin RuAl seed layer, an ultra-thin Cr-alloy underlayer, a Co-alloy onset layer and a CoPtCrB magnetic layer. To improve the lattice match between the RuAl and the Cr-alloy underlayer, CrTi or CrMo alloys are preferred. When a CrMo underlayer is used, a further advantage is that SNR is less sensitive to changes in the underlayer thickness. Magnetic properties and SNR data for disks with and without a CrTa pre-seed layer are listed in Table-I.

TABLE 1

| disk | structure | Hc (Oe) | Mrt | S* | SoNR (dB) |
|---|---|---|---|---|---|
| 1 | $RuAl_{50}/CrTi_{10}/CoCr_{37}/CoPt_{11}Cr_{20}B_7$ | 3040 | 0.375 | 0.66 | 27.6 |
| 2 | $CrTa_{50}/RuAl_{50}/CrTi_{10}/CoCr_{37}/CoPt_{11}Cr_{20}B_7$ | 3660 | 0.420 | 0.80 | 27.7 |
| 3 | $NiAl_{50}/CrV_{20}/CoCr_{37}/CoPt_{10}Cr_{20}B_6$ | 3400 | 0.420 | 0.78 | 26.4 |
| 4 | $AlTi_{50}/RuAl_{50}/CrTi_{10}/CoCr_{37}/CoPt_{11}Cr_{20}B_7$ | 3500 | 0.430 | 0.81 | 27.7 |

DETAILED DESCRIPTION OF THE PREFERRED EMBODIMENTS

The CrTa pre-seed layer of the invention is deposited by conventional DC magnetron sputtering. The relative composition of Cr versus Ta is selected to produce a film with an amorphous or nanocrystalline structure. The use of a CrTa pre-seed layer improves the media coercivity for a film structure with very thin RuAl seed layer and ultra-thin Cr alloy underlayer. Such a structural combination in one embodiment improved disk signal-to-noise ratio (SNR) by 1.3 dB as compared to a similar structure without a CrTa pre-seed layer.

In general the application of some type of seed layer on glass and other alternate substrates to control nucleation and crystallographic orientation of the Cr (or Cr alloys), and thereby the magnetic Co-alloy layer is well known. It was also disclosed in U.S. Pat. No. 5,789,056 that the use of a very thin seed layer and underlayer on glass media can reduce the grain size of magnetic alloy substantially, thereby improving SNR. By applying different compositions of seed layers, crystallographically textured (112) or (100) Cr layer can be deposited. By sputtering Co-alloys on these Cr underlayers, textures of either ($10\bar{1}0$) or ($11\bar{2}0$) in the magnetic layer can be achieved. For high deposition rate sputtering, it has been found that the application of an amorphous TaN seed layer on glass induces a (100) orientation in the subsequently grown Cr underlayer, which promotes a strong ($11\bar{2}0$) orientation in the Co-alloy layer. (See U.S.P.T.O application Ser. No. 09/020,151, filed: Feb. 6, 1998, THIN FILM MAGNETIC DISK HAVING REACTIVE ELEMENT DOPED REFRACTORY METAL SEED LAYER). However, the formation of TaN layer requires a reactive atmosphere in the sputtering chamber and, therefore, increases the manufacturing difficulty. The ($11\bar{2}0$) texture of a Co-alloy layer can also be obtained by depos- The Table 1 data shows that, although disk 1 and disk 2 have a comparable SoNR, disk 2 with a CrTa50, i.e., 50 at. % Ta, pre-seed layer exhibits a substantially higher Hc and coercive squareness S*. At the same Mrt as disk 3, disk 2 gives rise to a SoNR improvement of 1.3 dB as compared to the NiAl50 seed layer structure of disk 3. Disk 4, which was made with an AlTi50 pre-seed layer, also shows improved performance over the prior art NiAl50 (disk 3). The high coercivity and squareness achieved with the CrTa and AlTi pre-seeds is a result of creating the enhanced RuAl <100> and in-plane Co <1120> textures.

Figure 3:
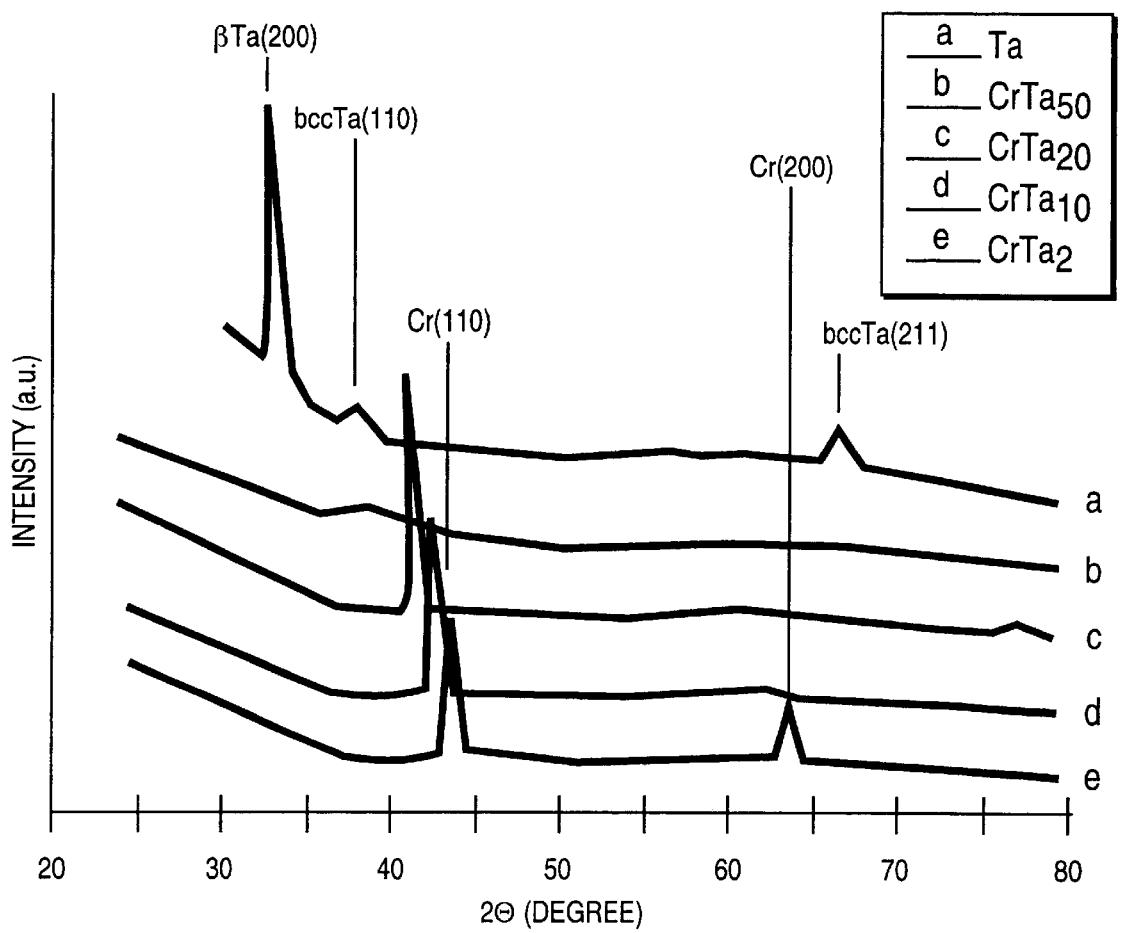
FIG. 3 illustrates x-ray diffraction data for a various samples which show the structural variations of CrTa with composition changes.

FIG. 3 shows the X-ray diffraction spectra for a set of film structures with CrTa50, CrTa20, CrTa10, CrTa2 and Ta only pre-seed layers. No significant peaks appear for the CrTa50 film indicating that this composition results in a substantially amorphous or nanocrystalline film. Both the pure Ta and CrTa20 films result in significant diffraction peaks indicating crystalline structure.

Figure 4:
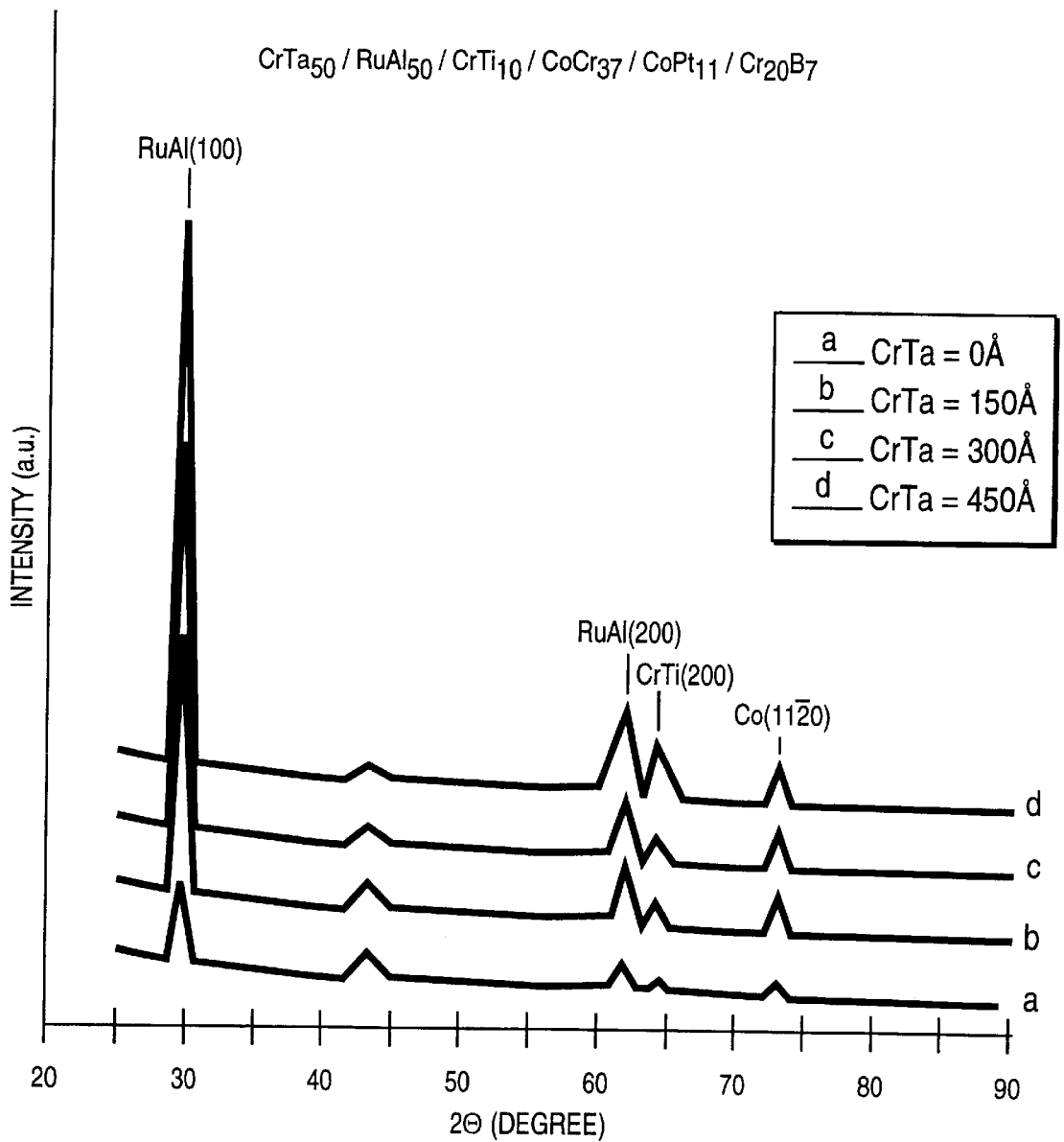
FIG. 4 illustrates x-ray diffraction data for a various samples of thin film magnetic disks which show the structural variations of the materials with changes in thickness of a CrTa50 thin film layer according to the invention.

FIG. 4 shows X-ray diffraction data for thin film disks made with varying thickness of CrTa50 pre-seed layers ranging from 0 to 45 nm. The results are believed to be valid up to a thickness of 60 nm. Throughout the X-ray spectra no crystalline CrTa diffraction peaks are observed, thus confirming its amorphous nature. It is known that the use of RuAl seed layer on glass substrate creates a Cr <200> texture which leads to a <$11\bar{2}0$> texture in the Co-alloy layer. For the film structure without the CrTa pre-seed layer, all the diffraction peak intensities are very weak, indicating poor structural integrity due to the deposition of very thin RuAl seed layer and CrTi underlayer directly on glass. By depositing a CrTa pre-seed layer, substantial enhancements of RuAl (100), (200), CrTi (200) and Co-alloy ($11\bar{2}0$) diffraction peaks are observed, indicating a significant improvement of the C-axis in-plane orientation.

Figure 5:
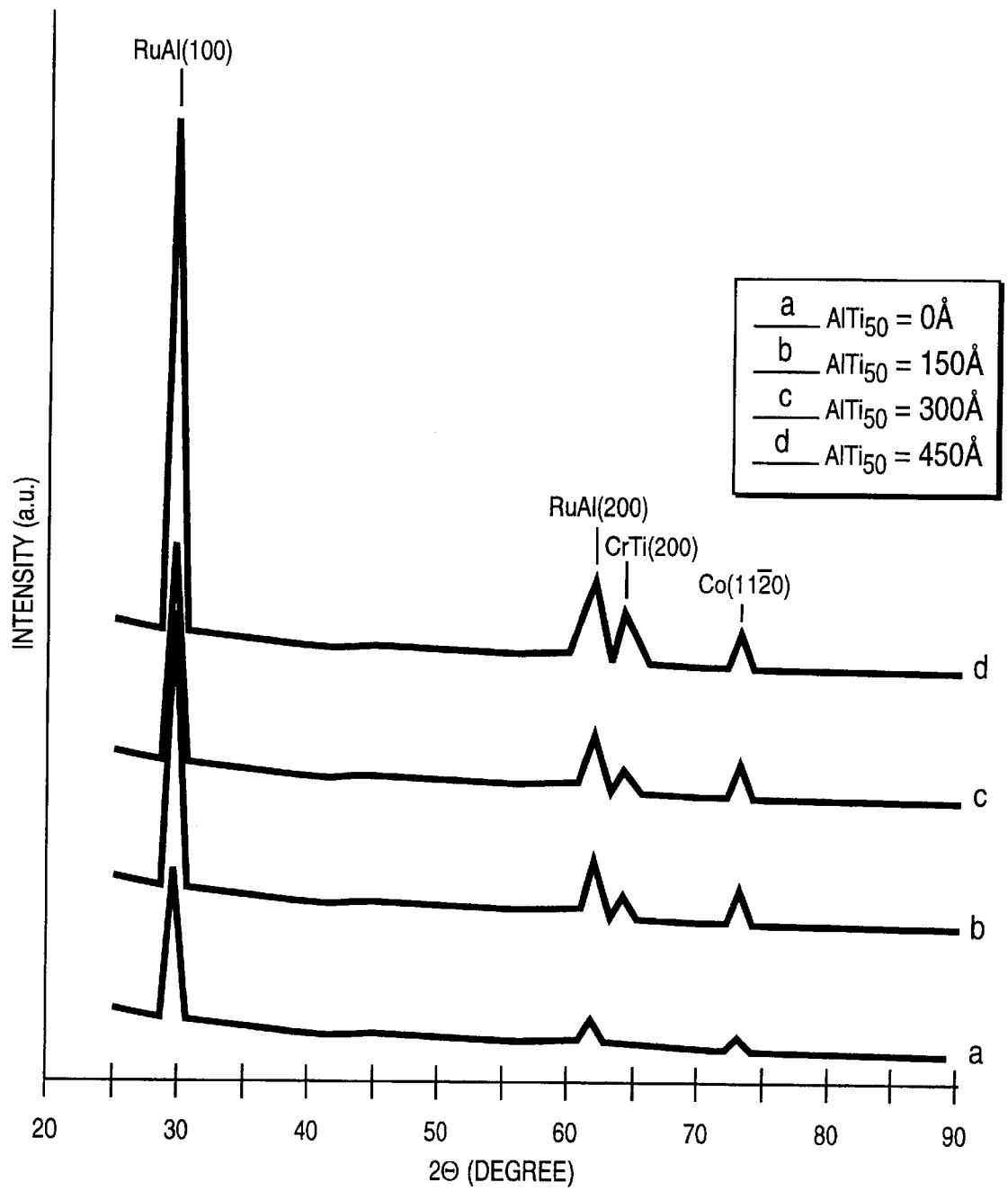
FIG. 5 illustrates x-ray diffraction data for a various samples of thin film magnetic disks which show the structural variations of the materials with changes in thickness of a AlTi50 thin film layer according to the invention.

FIG. 5 shows X-ray diffraction plots for disks made with 0, 150, 300 and 450 Angstroms of $AlTi_{50}$ pre-seed layers.

The results are believed to be valid down to a thickness of 100 Angstroms (Å), i.e. 10 nm. The disks had RuAl seed layers, CrTi underlayers and cobalt alloy magnetic layers. The graph shows that the preferred orientations of RuAl (100), RuAl(200), CrTi(200) and Co(11$\bar{2}$0) strengthen with increased thickness of the AlTi pre-seed layer. As shown in FIG. 3 the preferred composition for the CrTa pre-seed layer is CrTa$_{50}$. The behavior of AlTi is similar to CrTa in this respect, so the preferred composition for a AlTi is also 50—50.

Table 2 summarizes the values of full width half maximum (FWHM) derived from the RuAl (200) and Co (11$\bar{2}$0) peaks. It is clear that the much small FWHM values are measured for the film structure with either CrTa$_{50}$ or AlTi$_{50}$ pre-seed layers. The small FWHM indicates a high degree of in-plane texture and less dispersion of [11$\bar{2}$0] preferred orientation of the hexagonal Co structure.

proliferating layers, the RuAl layer can be effective in achieving the beneficial results described herein so long as it is deposited in the B2 structure and ahead of the magnetic layer. Thus, the RuAl layer in the preferred embodiment is intended to be as the first non-amorphous layer to influence crystallographic orientation and grain size of subsequently deposited magnetic material.

In a preferred embodiment of the invention, the CrTa or AlTi pre-seed layer is sputter deposited onto the substrate (which may already have thin films on it) from targets composed a) substantially of CrTa and preferably CrTa50, or b) substantially AlTi and preferably AlTi50. The RuAl seed layer is deposited onto the pre-seed layer by standard sputtering techniques. It is followed by a Cr-alloy underlayer, a Co-alloy onset layer and a CoPtCrB magnetic layer. The use of an onset layer is described in a commonly assigned, U.S. patent application with Ser. No. 08/976,565 (now U.S. Pat. No. 6,143,388). Briefly, the onset layer

TABLE 2

| Film structure | RuAl (200) (°FWHM) | Co (1120) (°FWHM) |
|---|---|---|
| RuAl$_{50}$/CrTi$_{10}$/CoCr/CoPtCrB | 17.6 | 12.8 |
| CrTa$_{50}$/RuAl$_{50}$/CrTi$_{10}$/CoCr/CoPtCrB | 5.8 | 5.2 |
| AlTi$_{50}$/RuAl$_{50}$/CrTi$_{10}$/CoCr/CoPtCrB | 8.7 | 6.8 |

It is also known that the poor thermal conductivity of glass substrates can cause the recorded data bits to be thermally erased. The use of a relatively thick CrTa pre-seed layer could potentially have some advantage in improving the thermal erasure issue related to a glass disk medium.

Use of sputtered NiP oxide pre-seed layer together with a NiAl seed layer was published by Chen, Yen, Ristau, Ranjan [4]. Their results showed a <112> Cr texture due to the use of NiAl seed layer. In contrast to the NiP oxide, the CrTa pre-seed layer enhances RuAl<100> and Cr<200> textures, and therefore enhances Co-alloy<1120> texture. The manufacturing process simplicity of CrTa pre-seed layer is also an advantage over NiP.

RuAl tends to form the B2 (cesium chloride) structure in a sputtered thin film. Small amounts of other materials could conceivably be added to RuAl without disrupting the critical B2 structure. The B2 structure is an ordered cubic structure that can be described as two interpenetrating simple cubic lattices where, for RuAl, Al atoms occupy one lattice and Ru atoms the other. RuAl has a lattice constant which is close to that of Cr even though Cr has a bcc structure. RuAl tends to form smaller grain size than Cr due to the strong bonding between the Ru and Al atoms which reduces atomic mobility during deposition.

The role of the RuAl layer of the preferred embodiment of invention is to ultimately control the orientation, grain size and grain size distribution of the magnetic grains. The grain size and orientation achieved in a RuAl layer is propagated into the magnetic layer through epitaxial growth of properly selected subsequent layers including the magnetic layer. Whereas the traditional thin film magnetic disk has only three layers e.g., underlayer, magnetic layer and overcoat, the trend in the field is toward using additional layers. The terminology for these additional layers has not become standardized, but in a descriptive sense, there may be pre-seed layers, seed layers, one or more underlayers, nonmagnetic or magnetic onset layers, a plurality of magnetic layers which may or may not have spacers layers separating them. In addition what is called the "substrate" may in fact be multilayered material. In this context of material is selected in part for its lattice match with the underlayer. Lattice parameters which are intermediate between that of the underlayer and the magnetic layer may strengthen the epitaxy in the desired orientation. The preferred onset layer is of hexagonal close packed (hcp) structured material which may be magnetic or nonmagnetic. Materials which are usable for the onset layer include a wide range of cobalt alloys such as CoCr, CoPtCr and CoPtCrTa. A specific example, a magnetic onset layer of CoPtCrTa might comprise 4 to 14 at. % platinum, 10 to 23 at. % chromium and 1 to 5 at. % tantalum with the rest being Co. Other commonly used hcp magnetic materials which could be used for the onset layer include CoNiCr, CoCrTa, etc. Nonmagnetic materials such as CoCr (Cr>30 at. %) can also be used as onset layers.

Although the inventors prefer to use the onset layer, it is not strictly necessary to include it in the structure to obtain the benefits of the CrTa or AlTi pre-seed layers. Thus, a CrTa/RuAl/CrX/CoX structure is a practical embodiment of the invention.

Figure 2:
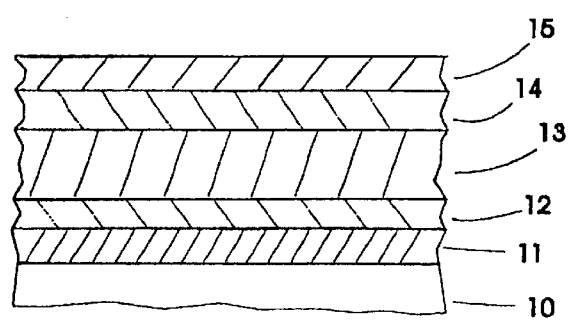
FIG. 2 illustrates the layer structure of a thin film magnetic disk according to the invention.

FIG. 2 illustrates the cross sectional layer structure of an embodiment of a thin film magnetic disk according to the invention. The thin film layers will be deposited onto at least one and preferably both planar surfaces of the disk to form the data recording area. The substrate 10 may be made of glass or any other suitable material. The CrTa pre-seed layer 11 is deposited onto the substrate. The RuAl seed layer 12 is deposited directly onto the CrTa. The seed layer could also be a "double" layer with a layer of RuAl followed by a layer of NiAl, for example. This double layer configuration could result in a cost savings by reducing the required amount of Ru which is the more expensive element of this group. In the double layer structure the RuAl establishes the grain size and orientation and the subsequently deposited NiAl follows the established patterns. The underlayer 13 is deposited onto the seed layer and is a nonferromagnetic material such as a chromium alloy such as CrV or CrTi. The onset layer 14 has been described above. The magnetic layer 15 is an alloy of cobalt which typically contains platinum and chromium and may contain additional elements such as tantalum or boron, e.g. CoPtCrTa or CoPtCrB. Although the use of the CrTa pre-seed layer and RuAl seed layer do not require special selection of a magnetic layer material, a typical magnetic layer might comprise 4 to 16 at. % platinum, 14 to 23 at. % chromium and 2 to 10 at. % boron with the rest being Co. The optional top layer is a protective overcoat 16 which is typically carbon based and may contain hydrogen and/or nitrogen, but any other protective material may be used. It is also known in the art to use additional layers between the magnetic layer and the overcoat to either enhance the adhesion of the overcoat or improve hardness, etc. The various layers are preferably sputter deposited using standard techniques, targets, temperatures and pressures are known to those skilled in the art.

The relative thickness of the layers, other than as noted above, are not believed to be critical for practicing the invention, but the following ranges are given as guidance. The RuAl seed layer is preferably from 3 to 20 nm thick. A typical value for the thickness of the underlayer is 8–15 nm. A CrTi underlayer is preferably deposited to a thickness between 3 and 15 nm in thickness.

The onset layer can be 1 to 4 nm. The magnetic layer can be from 5–30 nm thick with 15–20 nm being typical. The use, composition and thickness of the overcoat are not critical in practicing the invention, but a typical thin film disk might use an overcoat less than 15 nm thick.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. It is also known that some small amount of oxygen is normally found in Cr targets and in the resulting Cr layer. It is also possible for small amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in the standard manner to either record or read magnetic information.

FIG. 1 is a top view illustrating a prior art disk drive with a rotary actuator in which a thin film disk according to the present invention may be used. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films described above. Electrical signals to and from the heads and the VCM are carried by a flex cable 118 to the drive electronics 119. When not operating and during periods when the rotation of the disks is either starting or stopping, the sliders may be removed from the disks using load/unload ramps (not shown) or parked in physical contact with the surface of the disks in a landing zone or contact start/stop (CSS) area 113 which is not used for data storage even though the magnetic coating extends over this area. If the sliders are unloaded from the disks during non-operation, there is no need to have a CSS area and more of the disk becomes available for data storage. Although the disk drive has been described with air bearing sliders the disk of the present invention may easily be used in other storage devices having near contact, or contact recording sliders.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a nonmetallic substrate;
   a pre-seed layer with an amorphous or nanocrystalline structure being directly deposited upon said substrate, said pre-seed layer consisting essentially of AlTi;
   a nonmagnetic ruthenium-aluminum (RuAl) seed layer having a B2 structure and being deposited upon the pre-seed layer;
   at least one nonmagnetic underlayer being deposited upon the RuAl seed layer; and
   at least one magnetic layer deposited over the underlayer.

2. The disk of claim 1 wherein the RuAl layer has a <200> preferred orientation.

3. The disk of claim 1 wherein the pre-seed layer shows no significant x-ray diffraction peaks.

4. The disk of claim 1 wherein said at least one underlayer consists essentially of CrTi and contains approximately 10 at. % titanium.

5. The disk of claim 1 further comprising a thin film onset layer that is 1 to 4 nm thick, and which consists essentially of a cobalt alloy that is deposited between the underlayer and the magnetic layer, and wherein:
   the pre-seed layer has a thickness of greater than 10 nm;
   the seed layer is between 3 and 20 nm in thickness; and
   the underlayer is between 3 and 15 nm in thickness.

6. The disk of claim 1 wherein the pre-seed layer contains approximately 50 at. % Ti.

7. The disk of claim 1 wherein the pre-seed layer is greater than or equal to 10 nm in thickness.

8. The disk of claim 7 wherein the pre-seed layer is less than or equal to 60 nm in thickness.

9. The disk of claim 1 further comprising a thin film onset layer consisting of a cobalt alloy between the underlayer and the magnetic layer.

10. The disk of claim 9 wherein the onset layer consists of CoCr.

11. The disk of claim 10 wherein the magnetic layer comprises CoPtCrB.

12. The disk of claim 1 wherein the RuAl seed layer is between 3 and 20 nm in thickness.

13. The disk of claim 12 wherein said at least one underlayer is between 3 and 15 nm in thickness.

14. A disk drive comprising:

a motor for rotating a spindle;

a thin film magnetic disk mounted on the spindle comprising a nonmetallic substrate, an amorphous or nanocrystalline pre-seed layer being directly deposited upon said substrate, said pre-seed layer consisting essentially of AlTi; and a RuAl seed layer with a B2 structure being deposited upon said pre-seed layer; and at least one nonmagnetic underlayer being deposited upon the RuAl seed layer; and at least one magnetic layer being deposited over said underlayer; and an actuator assembly including a head for writing magnetic information on the disk as it rotates.

15. The disk drive of claim 14 wherein the RuAl seed layer has a <200> preferred orientation.

16. The disk drive of claim 15 wherein the underlayer consists essentially of CrTi and contains approximately 10 at. % titanium.

17. The disk drive of claim 16 further comprising a thin film onset layer consisting essentially of CoCr and being disposed between the underlayer and the magnetic layer.

18. The disk drive of claim 16 wherein the thin film magnetic disk further comprises a thin film onset layer 1 to 4 nm thick that consists essentially of CoCr and is deposited between the underlayer and the magnetic layer and wherein:

the AlTi pre-seed layer has a thickness of greater than 10 nm;

the RuAl seed layer is between 2 and 20 nm in thickness; and the CrTi underlayer is between 3 and 15 nm in thickness.

19. A method of manufacturing a thin film magnetic disk comprising the step of:

depositing a thin film pre-seed layer with an amorphous or nanocrystalline structure onto a nonmetallic substrate surface of a disk, said pre-seed layer consisting essentially of AlTi;

depositing a crystalline ruthenium-aluminium (RuAl) seed layer having a B2 structure upon the pre-seed layer;

depositing at least one nonmagnetic underlayer upon the RuAl seed layer; and depositing at least one magnetic layer over the underlayer.

20. The method of claim 19 wherein at least one said nonmagnetic underlayer is deposited by sputtering from a target containing chromium and titanium.

21. The method of claim 19 further comprising the step of depositing a thin film onset layer that is 1 to 4 nm thick and which consists essentially of CoCr that is deposited after the underlayer and before the magnetic layer.

22. The method of claim 21 wherein:

the pre-seed layer is deposited to a thickness of greater than 10 nm;

the RuAl seed layer is deposited to a thickness between 3 and 20 nm; and said at least one underlayer is deposited to a thickness between 3 and 15 nm.

* * * * *